United States Patent Office 3,296,238
Patented Jan. 3, 1967

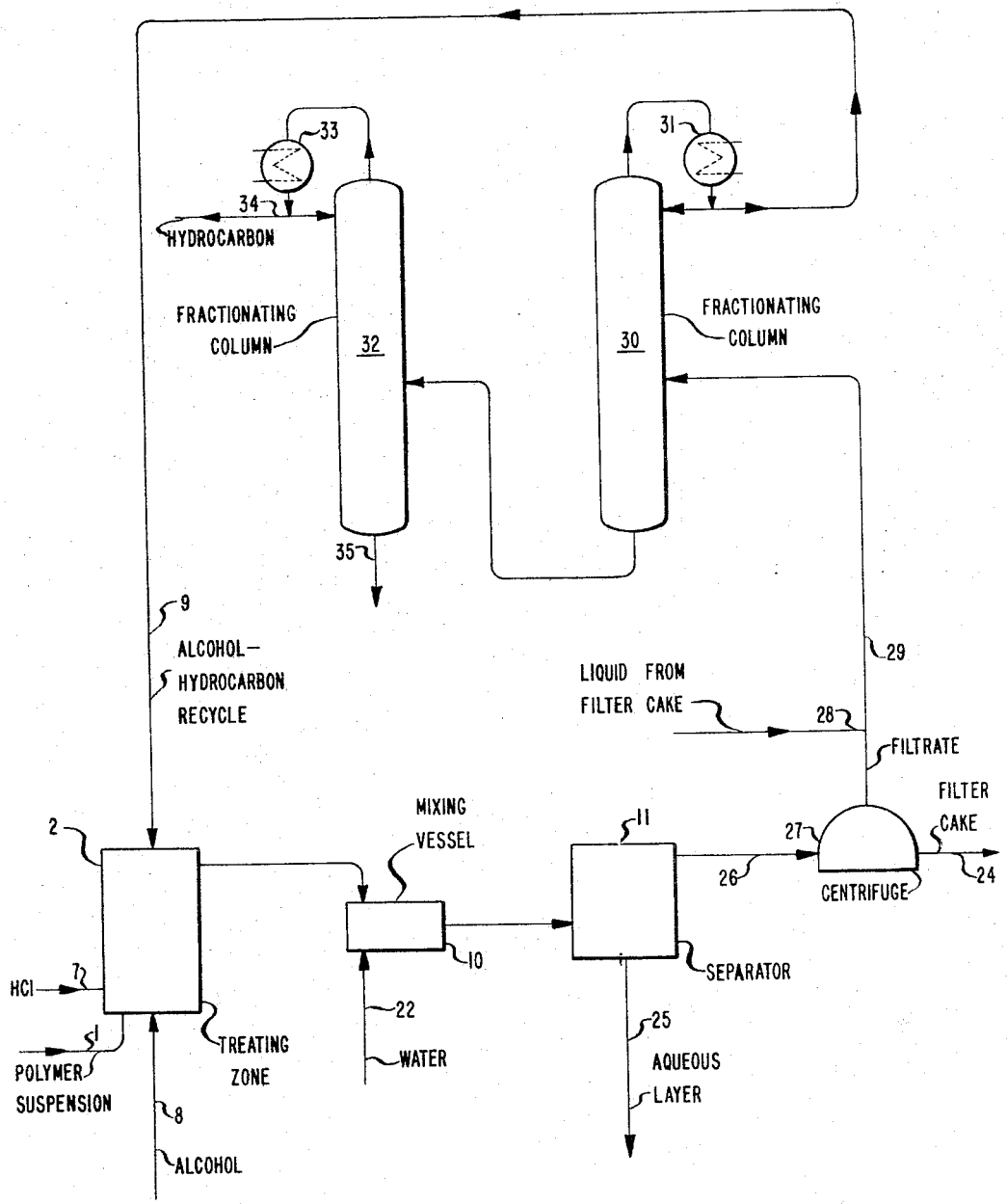

3,296,238
POLYMERIZATION PROCESS
Franciscus J. F. van der Plas, Amsterdam, Netherlands, assignor to Shell Oil Company, New York, N.Y., a corporation of Delaware
Filed Oct. 23, 1962, Ser. No. 232,488
Claims priority, application Netherlands, Nov. 1, 1961, 270,917
3 Claims. (Cl. 260—93.7)

The invention relates to a process for purifying such polymers as polyethylene and polypropylene and copolymers of ethylene and propylene that are contaminated by metal compounds which have been used as catalysts during the preparation of the polymers, or which have been formed from such catalysts. The invention relates in particular to a process in which alcohols that have been used in the purification are also recovered.

The invention is of particular importance for removing remnants of catalysts according to Ziegler or related catalysts, formed from compounds of titanium and/or vanadium and metal-organic compounds of aluminum. More generally, the invention applies in the treatment of reaction mixture slurries of polyolefins produced by contacting olefins in a hydrocarbon medium with coordination catalysts of transition metals. A great variety of such catalysts have been described in the literature. These are species or modifications of the so-called Ziegler catalysts; such catalysts consist, broadly, of two-component systems comprising a compound of the left hand subgroups of Groups IV–VI or Group VIII of the Mendeléeff Periodic Table, as illustrated on page 28 of Ephraim, "Inorganic Chemistry," 6th English edition, and a Group I–III element or alloy or hydride or organic derivative with an organometallic bond.

These catalysts are sometimes further classified as "Ziegler type" or "metal alkyl-reducible metal halide type" and "Natta type" or "preformed metal subhalide type." This terminology is used, for example, in "Polyolefin Resin Processes" by Marshall Sittig, Gulf Publishing Company, Houston, Texas, 1961. The better known of these catalysts are the reaction products of halides, in order of preference chlorides and bromides, of transition metals from the left hand subgroups of the Mendeléeff Periodic Table, i.e., of Ti, Zr, Hf, Tl, V, Nb or Ta, with organo metallic reducing agents in which the metal is from Groups I, II or III. Preferred reducing agents are organoaluminum compounds and particularly aluminum alkyls, including aluminum alkyl halides. Suitable catalysts are illustrated on pages 328 to 367 of "Linear and Stereoregular Addition Polymers" by Gaylord and Mark, Interscience Publishers, Inc., New York, 1959. The most effective catalysts for the production of isotactic polypropylene known to date are those prepared from active forms of titanium trichloride and certain aluminum alkyls or aluminum alkyl halides.

In polymerization processes in which such catalysts are used, a suspension of polymers in a liquid hydrocarbon is generally obtained, remnants of catalyst being present in the liquid, but also to some extent occluded in the polymer particles. For various applications of such polymers, careful removal of these catalyst remnants is necessary as they have an adverse influence on electrical properties and transparency and also may give rise to corrosion of polymer processing machines. An indication of the presence of catalyst remnants is provided by the ash content and by the content of metal compounds in the ash.

The application of monohydric alcohols for removing such catalyst remnants is known. The application of alcohols together with hydrogen chloride is also known; in a subsequent stage of the process alcohol and hydrogen chloride have together been separated from the polymer by filtration or by washing with water. After the treatment the alcohol that has been used in such purification processes is often present in a corrosive liquid, such as an aqueous layer containing hydrogen chloride and other chlorides. Recovery of alcohol from such corrosive liquids is troublesome.

This invention provides a purification process in which alcohols, hydrogen chloride and water are utilized and by which polymers having a low and constant ash content are obtained, in which the number of operations is small and in which alcohol used can be recovered by simple means from a liquid that is not corrosive or scarcely so.

The invention therefore relates to an improved process for purifying polymers contaminated by metal compounds, which polymers are suspended in hydrocarbons, by treatment with hydrogen chloride, an alcohol and finally water; the improvement comprises a method for the recovery of alcohols used for this purpose, the characteristic feature being that a suspension obtained by polymerization of olefins in saturated hydrocarbons in the presence of metal compounds, to which have been added hydrogen chloride and an alcohol that is not homogeneously miscible with water in all ratios, is washed with not more than 10% by volume of water, as referred to the volume of the suspension, after which first the water layer and then the polymer is separated and subsequently alcohol, or a mixture of alcohol and hydrocarbon, is recovered from the organic liquid by distillation.

While this invention is particularly adapted to the recovery of solid, stereoregular polypropylene, it can also be applied in the recovery of other solid polyolefins produced by contact with coordination catalysts of transition metals. The process may be used in the recovery, from their reaction mixture slurries in hydrocarbons, of polyethylene, polybutenes, and polymers of other olefins of the general formula $RCH=CH_2$ wherein R is an aliphatic, cycloaliphatic or aromatic hydrocarbon radical of up to 20 carbon atoms. The preferred polyolefins are derived from olefins for which R is hydrogen or a $C_1$ to $C_7$ straight or branched alkyl group. Solid polymers are produced, for example, from 3-methyl-1-butene, 4-methyl-1-pentene, 4-methyl-1-hexene, and the like and may also be produced from alicyclic or aromatic olefins such as styrene, allylbenzene, vinyl cyclohexane, and the like, and from some mixtures of such olefins.

In the polymer recovery processes heretofore used, the alcohol has generally been a $C_1$ to $C_3$ alcohol, i.e., an alcohol which is miscible with water in all proportions, but which is not completely miscible with aliphatic hydrocarbons in all proportions. This has caused some difficulties in the catalyst killing step. Contact of alcohol with the polymerization reaction mixture took place under two-phase conditions, leading sometimes to deposit of metal salts on the walls of the contacting vessel as a result of supersaturation of the alcohol layer, and also leading to inefficient extraction of metal residue from the polymer. These problems are overcome by using a $C_4$ or higher alcohol.

A further difference between use of the $C_4$ and higher alcohols and $C_3$ and lower alcohols is that addition of water to two-phase hydrocarbon-lower alcohol mixtures results in a washed hydrocarbon-polymer slurry phase and a water-alcohol-metal salt-acid phase, whereas the addition of a relatively small amount of water to the single phase hydrocarbon-higher alcohol mixture results in selective extraction of the acid and metal salts into the water phase, with retention of substantially all of the alcohol in the hydrocarbon-alcohol phase. The present invention takes advantage of this difference, in providing a method for discarding the undesired acid and metal salts in a water phase which requires no further working for alcohol recovery, while all the valuable components are retained in a relatively non-acidic hydrocarbon phase which can then be handled in relatively simple fashion for recovery of polymer, hydrocarbon solvent, and alcohol.

Alkanols of at least four carbon atoms per molecule are not homogeneously miscible with water in all ratios. The alcohols used according to this invention are selected from that group. Since the alcohol should also be distillable, it is preferred to employ those having no more than 12 carbon atoms per molecule, and particularly the butanols and pentanols. Preferred alcohols are, for example, butanols, such as n-butanol, isobutyl alcohol, and secondary butyl alcohol (butanol-2), and pentanols, such as amyl alcohol, secondary amyl alcohol and secondary isoamyl alcohol. Secondary butyl alcohol is particularly preferred.

Usually, alcohols that distill azeotropically with the hydrocarbons applied are used in processes of this invention. Homogeneous mixtures of alcohols and hydrocarbons obtained by such distillation may be used for the purification of polymer suspensions in the same way as the alcohols themselves.

Suitable combinations of hydrocarbons and alcohols for use in this invention are hexanes together with butanols, heptanes together with butanols or pentanols, octanes together with butanols or pentanols, and mixtures of hydrocarbons which consist completely or mainly of heptanes and/or octanes together with butanols or pentanols. Other suitable combinations are propane, butane or pentane together with butanols or pentanols.

The suspensions obtained by polymerization of olefins may, if so desired, be diluted by the addition of hydrocarbons, or else be concentrated by removal of a part of the hydrocarbon prior to addition of alcohol. The polymer concentrations most suitable for the purpose of the invention are generally between 3 and 25% by weight.

Hydrogen chloride and alcohol may be admixed simultaneously or in successive stages. The amount of hydrogen chloride may be small; quantities between 0.01% and 1% by weight of the polymer suspensions are generally sufficient. Preferably, quantities between 0.05% and 0.7% are applied.

The amount of alcohol used may also be small. Usually the amount of alcohol in parts by weight is smaller than the amount of the polymer to be treated, often less than 50% of the latter. A small percentage by volume as referred to the volume of the suspension, for instance, 0.5 to 4% of secondary butyl alcohol on a suspension of polypropene in isooctane, is generally quite adequate.

The temperature at which the treatment of the suspension with hydrogen chloride and alcohol takes place may be considerably varied. Suitable temperatures are between 15° and 150° C. Temperatures lower than 15° C. and higher than 150° C. are not excluded, however. Preferred temperatures are between 50 and 100° C. and especially between 50° and 80° C. The pressure is generally atmospheric pressure, but pressures higher or lower than atmospheric, e.g., up to the polymerization process pressure, which may be as high as 500 p.s.i. or higher, may be used.

The amount of water with which the pretreated polymer suspension is washed according to the invention is relatively small. Amounts of less than 10% by volume, e.g., 1 to 5%, or less, as referred to the volume of pretreated suspension, are generally sufficient for effective removal of hydrogen chloride and salts. To avoid losses of alcohols, the quantity of water used is preferably kept as small as possible. Procedures in which washing with water is carried out continuously and in countercurrent are preferred. The washing process can be carried out in several stages, in each stage polymer suspension being mixed with washing water and then separated from the wash water. Preferably, during the washing process, or during the mixing in each of the stages thereof, the mixture is stirred to assume homogeneous distribution.

The temperature at which the washing process is performed may also be varied to a considerable degree, for instance between 15° and 100° C. Temperatures above 50° C. are preferred, for instance between 50 and 85° C. As a rule the pressure is atmospheric, but pressures higher or lower than atmospheric, e.g., up to 500 p.s.i or higher, are not excluded. Temperatures above 50° C. during the washing process generally have the advantage of a rapid transfer of hydrogen chloride and salts to the water phase. In some cases, moreover, alcohols that are not homogeneously miscible with water in all ratios are extracted by water to a lesser degree at temperatures above 50° C. than at lower temperatures. This is, for instance, the case with secondary butyl alcohol, especially if the hydrocarbon used is isooctane.

The wash water is finely distributed in the suspensions concerned as long as the mixture is sufficiently stirred, but otherwise it can as a rule be easily and completely separated from the polymer suspension. The separation of wash water is promoted by slow stirring, for instance with a vane stirrer. Preferably, the stirrer is placed in such a position as to move the vanes in the interface between suspension and water. The separation of wash water is also preferably effected at temperatures above 50° C.; in general, the temperatures and pressures at which the washing itself is carried out are suitable.

From suspensions from which ash-forming components and hydrogen chloride have been removed by the process described above, the polymer may be separated in the usual manner, for instance by filtration or centrifuging. The filtrate thus obtained is a homogeneous mixture of hydrocarbons and alcohol. According to the invention this liquid is subjected to distillation, for instance, azeotropic distillation. Such distillation may be carried out in two continuous distillation columns placed in series, the top product of one column being hydrocarbon and the top product of the other being alcohol, or a mixture of alcohol and hydrocarbon. In cases when the filtrate still contains polymer in the dissolved or suspended state, it can be an advantage to carry out the distillation in three columns placed in series. Alcohol and liquid hydrocarbon are then passed over completely as vapor in the first column and polymer remnants removed as bottom product. Before entering the second column, the vapor mixture is condensed, after which entrained water can be separated.

The various operations of which the process according to the invention consists may be carried out either batchwise or continuously. Continuous operation is preferred. In various stages of the process stationary conditions may be applied to mixtures that are kept more or less homogeneous, material being continuously fed in and discharged. In this case, several treatments of the suspension can be carried out, if desired, in two or more chambers connected in series, in each of which the mixture is kept more or less homogeneous.

The time required for treatment in the various phases of the process under consideration depends on circumstances, such as the character and method of production of the polymer, the temperature and concentrations applied, and the method and rates of stirring during pretreatment, washing out and settling. The order of magnitude is generally from some minutes to several hours. Division into stages may reduce the time needed.

The invention is illustrated by an example. An installation for continuous application of the process according to the example is illustrated schematically in the sole figure of the drawing.

A polymer suspension is introduced via line 1 into treating zone 2, which may consist of one or a plurality of suitable vessels provided with stirrers, heat exchange means and the like, as required. Hydrogen chloride gas is fed to zone 2 via line 7, alcohol via line 8 and a recycle stream of recovered alcohol and hydrocarbon via line 9. The pretreated suspension is passed to mixing and separating zones, represented schematically by mixing zone 10 and separating zone 11. Water is supplied to mixing zone 10 via line 22. This mixing zone may comprise a plurality of mixing and separating vessels, or a single device, such as a contacting tower, with a plurality of stages. Flow of water is preferably countercurrent to flow of polymer slurry. Wash water containing acid and salt is discharged from separator 11 through line 25. The washed suspension is conveyed through line 26 to centrifuge 27. Filter cake is removed via line 24 for removal of organic liquid in the filter cake by evaporation and condensation of the vapor by an evaporator and condenser, not shown. Recovered liquid is combined via line 28 with the filtrate in line 29, which conducts the filtrate to fractionating column 30. The top product, consisting of alcohol and hydrocarbon, is condensed in cooler 31 and returned via line 9 to zone 2. The bottom product is passed to distillation column 32. The top product of column 32, a hydrocarbon stream, is condensed in cooler 33 and discharged through line 34; the bottom product, a contaminated hydrocarbon stream, is discharged through line 35.

*Example*

The process according to the invention was applied to a 15% by weight suspension of polypropylene in technical isooctane (2,2,4-trimethylpentane). The polymer had been formed under the influence of a catalyst which had been made by reduction of 4 mmoles of titanium tetrachloride with 1⅓ mmoles of triethyl aluminum at 170° C. and subsequent admixture of 12 mmoles of diethyl aluminum chloride. These quantities are calculated per liter of reaction mixture. The specific gravity of the polymer suspension was 0.72.

The installation as shown in the accompanying drawing was used. Treating zone 2 consisted of two stirred vessels, in series, maintained at a temperature of 70° C. The aforesaid suspension was fed continuously to the first vessel. To the first vessel was also fed continuously 3 grams of hydrogen chloride and 20 ml. of secondary butyl alcohol, both per liter of suspension fed in. The suspension was continuously passed from the first to the second vessel and then continuously discharged to the washing unit. The average residence time in each of the treating vessels was 1½ hours.

Then the suspension was washed continuously and in countercurrent with 5% by volume of water in three mixing and settling units, maintained at temperatures between 50 and 70° C. In the separators the suspension was stirred with vane stirrers turning at 8 r.p.m.

Polypropylene was separated from the washed suspension by centrifuging. Organic liquid was recoverd from the filter cake by evaporation and condensation. This liquid was combined with the filtrate. The volume of the filtrate was then 85% by volume of the suspension used. Upon distillation in column 30, 15% by volume of top product was obtained, as referred to filtrate fed in; this top product contained 15% by weight of secondary butyl alcohol and less than 0.1% by weight of water. The amount recovered was therefore 85% of the butanol-2 used. The top product was continuously fed into the first treating vessel. The amount of fresh secondary butyl alcohol was then reduced to 3 ml. per liter of suspension fed in.

In this experiment, which lasted 500 hours, polypropylene containing 20-30 p.p.m. (parts per million) of titanium and 20-40 p.p.m. of aluminum was obtained. The isooctane recovered as top product from column 32 contained less than 5 p.p.m. of secondary butyl alcohol.

The drawing and example are for the purpose of illustrating a preferred mode of practicing this invention, and are not to be considered as limiting the invention. While the example illustrates the invention as practiced with a particular polymer, prepared with a particular catalyst, and treated by contact at specified conditions with specified proportions of secondary butyl alcohol and water. Other polymers, prepared with other catalysts, may be treated with other $C_4$ or higher alcohols and water, within the scope of this invention as described in greater detail hereinbefore.

I claim as my invention:

1. In a process for the production of solid polyolefins by contact of a monoolefin of from 2 to 3 carbon atoms per molecule with a catalyst comprising a halide of titanium and an aluminum alkyl compound, in which polymer is recovered from the reaction zone in finely divided form suspended in alkane of from 3 to 8 carbon atoms per molecule, the improvement which comprises
    (a) adding to said polymer suspension from 0.05% to 1% by weight of hydrogen chloride and from 0.5 to 4% by volume of an alkanol of from 4 to 5 carbon atoms per molecule,
    (b) agitating the resulting mixture at a treating temperature of from 15° to 150° C.,
    (c) providing thorough contact of the treated mixture with from 1 to 5 percent by volume of added water, at a temperature of from 15° to 150° C.,
    (d) settling the mixture,
    (e) separating and removing the aqueous layer,
    (f) separating solid polymer from the non-aqueous layer,
    (g) recovering an azeotrope of alkane and alcohol, free of contaminants, from the remaining non-aqueous liquid by distillation, and
    (h) recycling said azeotrope to said polymer suspension in step (a).

2. A process according to claim 1 in which said olefin is propylene, said alkane is an octane, said alkanol is secondary butanol, added in an amount of about 2 percent by volume, said water is added in an amount of about 5% by volume, and said temperatures are in the range from 50° to 100° C.

3. In the process for the production of solid polyolefins by contact of an alpha-monoolefin with a catalyst comprising a transition metal compound and a metal-organic compound, in which polymer is recovered from the reaction zone in finely divided form, suspended in a hydrocarbon, the improvement which comprises
    (a) adding to said polymer suspension hydrogen chloride and an alkanol of from 4 to 12 carbon atoms per molecule,
    (b) agitating the resulting mixture,
    (c) providing thorough contact of the mixture with added water in an amount of from 1 to 10% by volume,
    (d) settling the mixture,
    (e) separating and removing the aqueous layer,
    (f) separating solid polymer from the non-aqueous layer,
    (g) recovering hydrocarbon solvent and alcohol, free of contaminants, from the remaining non-aqueous liquid by distillation, and
    (h) recycling at least the preponderant part of said recovered alcohol to said polymer suspension in step (a).

References Cited by the Examiner

UNITED STATES PATENTS

| 2,938,021 | 5/1958 | Geiser et al. | 260—94.9 |
| 3,066,130 | 11/1962 | Grundmann et al. | 260—94.9 |
| 3,082,199 | 3/1963 | Lattenkamp et al. | 260—94.9 |
| 3,216,986 | 11/1965 | Fritz et al. | 260—94.9 |

OTHER REFERENCES

Azeotropic Data, American Chemical Society, Washington, D.C., 1952, page 126.

JOSEPH L. SCHOFER, *Primary Examiner.*

M. B. KURTZMAN, *Assistant Examiner.*